United States Patent [19]

Scheuneman

[11] Patent Number: 4,531,213
[45] Date of Patent: Jul. 23, 1985

[54] MEMORY THROUGH CHECKING SYSTEM WITH COMPARISON OF DATA WORD PARITY BEFORE AND AFTER ECC PROCESSING

[75] Inventor: James H. Scheuneman, St. Paul, Minn.

[73] Assignee: Sperry Corporation, New York, N.Y.

[21] Appl. No.: 643,086

[22] Filed: Aug. 21, 1984

Related U.S. Application Data

[63] Continuation of Ser. No. 354,340, Mar. 3, 1982, abandoned.

[51] Int. Cl.[3] .............................................. G06F 11/08
[52] U.S. Cl. ....................................................... 371/3
[58] Field of Search ............... 371/3, 37, 38; 364/200, 364/900

[56] References Cited

U.S. PATENT DOCUMENTS

| | | | |
|---|---|---|---|
| 3,755,779 | 8/1973 | Price | 340/146.1 |
| 4,077,028 | 2/1978 | Lui et al. | 340/146.1 |
| 4,077,565 | 3/1978 | Nibby, Jr. et al. | 235/312 |
| 4,223,382 | 9/1980 | Thorsrud | 371/3 X |
| 4,319,356 | 3/1982 | Kocol et al. | 371/38 |
| 4,319,357 | 3/1982 | Bossen | 371/38 |
| 4,345,328 | 8/1982 | White | 371/38 |

OTHER PUBLICATIONS

Blazejewski, T. J., et al., "Mechanism for Checking Parity and Error Checking and Correction Functions in Processors and Processor-Linked Subsystems", *IBM Technical Disclosure Bulletin*, vol. 21, No. 12, May 1979, 4871–4877.

*Primary Examiner*—Jerry Smith
*Assistant Examiner*—Clark A. Jablon
*Attorney, Agent, or Firm*—Charles A. Johnson; Kenneth T. Grace; Marshall M. Truex

[57] ABSTRACT

For use with a digital memory system that generates error correction code signals for storage with associated data words and for correction of detected error(s) in the associated data words when accessed, a system for through checking the accuracy of generation of the error correction codes and the decoding of error correction code is described. A data word parity signal is generated for storage with the associated data word and its associated check bit. When a data word is accessed, the read data word and its associated check bits are applied to error correction circuitry that results in a determination of whether or not any bits of the read data word are in error. Correction circuitry corrects those error in the read data word that are correctable. The corrected read data word is applied to a parity generator circuit that generates that parity of the corrected read data word. A comparison circuit compares the word parity calculated for the corrected read data word. Comparison indicates that the error correction system and through check system functioned properly, and failure of comparison indicates an error occurred in the throughput of the data word.

4 Claims, 15 Drawing Figures

ECC ERROR DETECTOR

SYNDROME BIT GENERATOR STAGE

| BYTE 0 | BYTE 1 | BYTE 2 | BYTE 3 | P0 P1 P2 P3 |
| 9-BITS | 9-BITS | 9-BITS | 9-BITS | |
INPUT DATA WORD FORMAT
Fig. 2
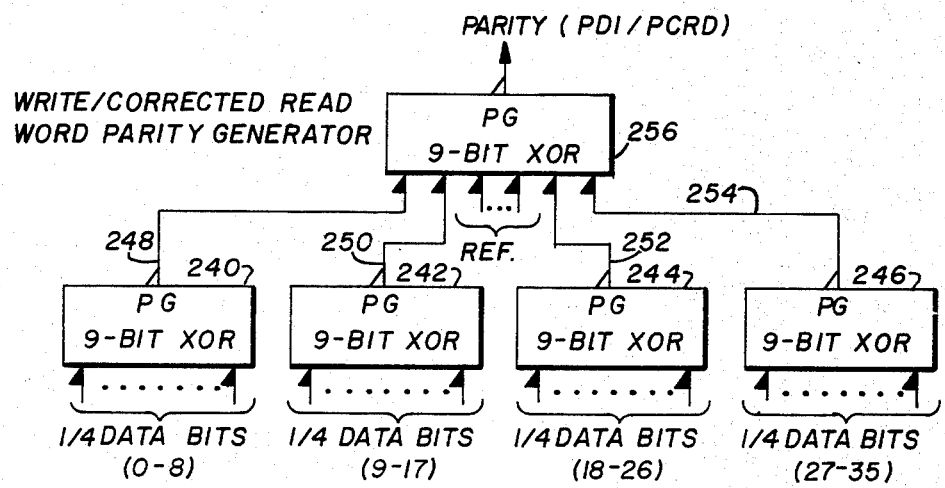
Fig. 8
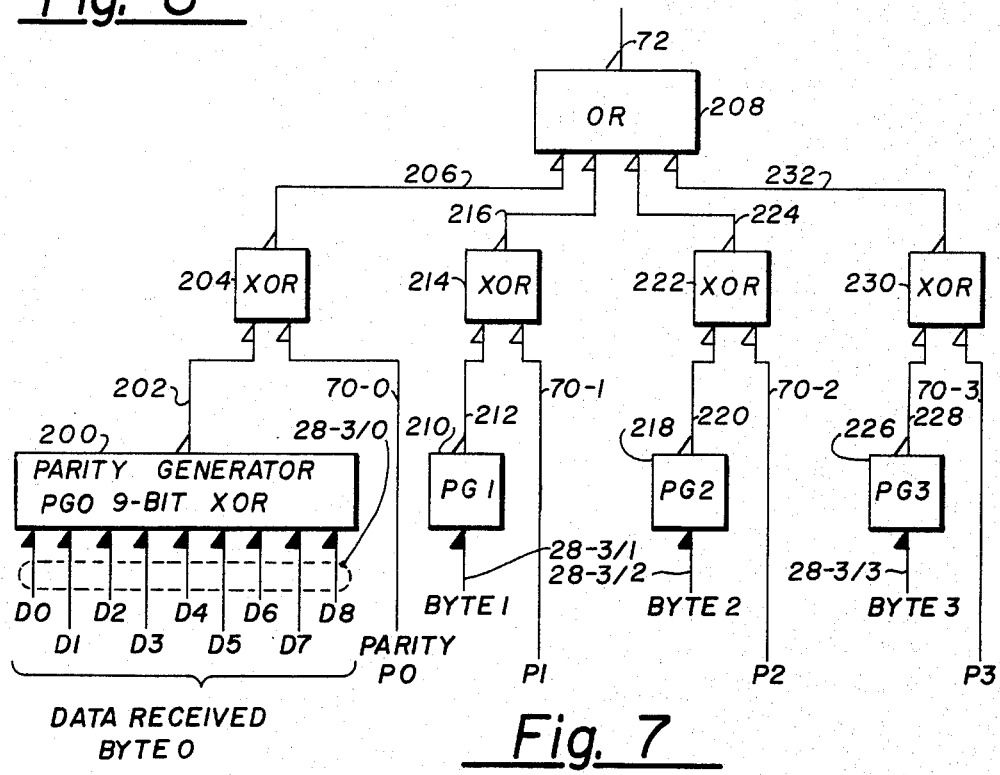
Fig. 7

WRITE WORD FORMAT

|  | | S2 | 0 | 0 | 0 | 0 | 1 | 1 | 1 | 1 |
|---|---|---|---|---|---|---|---|---|---|---|
|  | | S1 | 0 | 0 | 1 | 1 | 0 | 0 | 1 | 1 |
|  | | S0 | 0 | 1 | 0 | 1 | 0 | 1 | 0 | 1 |
| ST S5 S4 S3 | | | | | | | | | | |
| 1 0 0 0 | | | CT | C0 | C1 | · | C2 | · | · | · |
| 1 0 0 1 | | | C3 | · | · | · | · | · | · | · |
| 1 0 1 0 | | | C4 | · | · | · | 0 | 1 | 2 | 3 |
| 1 0 1 1 | | | 4 | 5 | 6 | 7 | 8 | 9 | 10 | 11 |
| 1 1 0 0 | | | C5 | · | · | · | · | · | · | · |
| 1 1 0 1 | | | 12 | 13 | 14 | 15 | 16 | 17 | 18 | 19 |
| 1 1 1 0 | | | 20 | 21 | 22 | 23 | 24 | 25 | 26 | 27 |
| 1 1 1 1 | | | 28 | 29 | 30 | 31 | 32 | 33 | 34 | 35 |
| 0 0 0 0 | | | NE | · | · | · | · | · | · | · |

ERROR TABLE

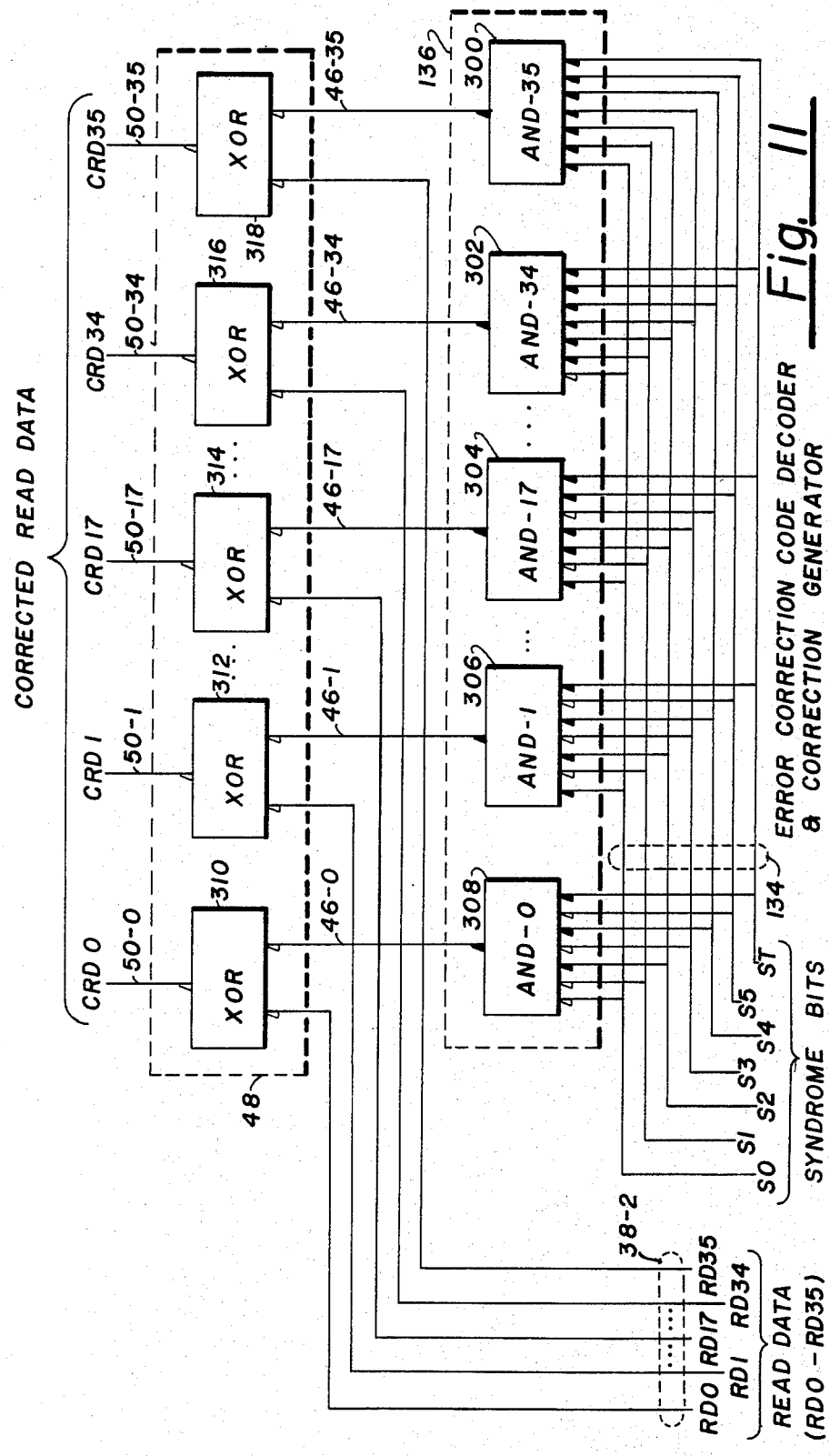

MEMORY THROUGH CHECKING SYSTEM WITH COMPARISON OF DATA WORD PARITY BEFORE AND AFTER ECC PROCESSING

This is a continuation of application Ser. No. 354,340, filed Mar. 3, 1982, now abandoned.

BACKGROUND OF THE INVENTION

1. Field of the Invention

This invention relates to the field of memory systems for use in data processing systems. More particularly, it relates to an improvement in memory systems that store data words at addressable locations in conjunction with error correction code signals, the improved memory system including through checking circuitry for checking the integrity of the recorded data words and the encoding and decoding of the associated error correction code signals.

2. Description of the Prior Art

Memory systems of various types have been developed through the years for use with data processing systems. These memory systems have included systems that store data serially, such as on magnetic, tapes, and those systems that store data at addressable locations. The latter type of systems are often referred to as "random access" systems indicating that the data is capable of being specifically identified and retrieved. Such access is in fact not "random", but instead, may more properly be referred to as "arbitrary access". Addressable memories can include various types of structures that are well known. These include magnetic drums, magnetic disks, magnetic core memories, integrated circuit memories, as well as other more esoteric memory configurations. Common to all memory systems utilized in binary data processing systems is the ability to record and read back some form of manifestation that can be distinguished between two possible states; one state indicating a binary zero and the other state indicating an binary one.

It has long been recognized that the integrity of the data bits stored and retrieved is critical to the accuracy of calculations performed in the data processing system. The alteration of one bit in a data word could dramatically affect arithemtic calculations, or could change the meaning of the recorded data. It was recognized that by associating an additional bit, called a "parity bit", with the binary bits comprising an addressable word, that erroneous data words could be detected. Parity is well known, and simply involves summing without carry the one bits in a data word and providing an additional parity bit that renders the total count across the data word including the parity bit either odd or even. It was determined that a single parity bit in conjunction with a data word comprised of multiple bits, for example 36-bits, that multiple error would defeat the parity system. As calculation rates increase, circuit sizes decrease, and signal levels correspondingly were reduced, the likelihood of errors occurring increased.

It had been recognized in data transmission systems that by properly encoding data bits, multiple errors could be detected and corrected after transmission. The overhead for such additional accuracy was the necessity for transmitting a larger number of bits since the error detection/correction signals had to be transmitted along with the data bits. The efficacy of utilization of error correction code signals was recognized for use in memory systems, and prior art systems have been developed wherein the data word to be stored in an addressable memory location is encoded to provide error correction code (ECC) signals that are stored along with the bits of the data word. Upon readout, the data bits read from the addressable memory location are again subjected to the generation of the same error correction code signal pattern, and the newly generated pattern is compared to the error correction code signals stored in the memory. If a difference is detected, it is determined that the data word is in error. Depending upon the encoding system utilized it is possible to identify and correct the bit position in the data word indicated as being incorrect. The system overhead for the utilization of error correction code signals is the time necessary to generate them, the memory cells necessary to store them, and the time required to make the decode at readout. These are the offsetting disadvantages for the advantageous operation involving data recording and reading back that has a higher degree of accuracy and integrity than systems that do not utilize the error correction code system.

With the addition of the circuitry necessary to generate the error correction code signals and the additional memory cells necessary to store them, it has been recognized that errors can occur in the generation of the error correction code signals through circuit faults, through the erronneous recording or readback of the error correction code signals through memory cell failure, or through read/write circuit failure. Such failures would lead to the indication of erronneous data, with the possibility of correct data bits being altered in the correction system, when in fact the error occured in the error correction code signal handling.

Systems have been developed utilizing redundant circuitry for performing various integrity checking functions, with the attendant additional cost of hardware, together with its own error-inducing probability due to circuit malfunction.

An example of a system that decribes generation of error correction code signals and the readout thereof, is in co-pending U.S. patent application entitled, "Memory Driver Failure Detection System and Method", Gary David Burns and Ferris Thomas Price the inventors, Ser. No. 324,290, now abandoned and assigned to the assignee of this invention. An example of a system that functions to check the accuracy of generation of error correction code signals prior to recording is described in co-pending U.S. patent application entitled, "Error Correction Code Through Check System", John Reed Trost the inventor, Ser. No. 354,328, and assigned to assignee of this invention. Each of the referenced co-pending patent applications is directed at maintaining the integrity of data through the memory system, and are particularly useful in identifying the causes of detected malfunctions, but do not directly provide for through checking of the error correction codes wherein malfunctions of circuitry on readout are detected.

OBJECTS

In view of the foregoing, it is a primary object of the invention to provide an improved memory system for use in a data processing system that has the capability of storing data words with associated error correction codes and provides through checking of the error correction code circuitry.

Yet another object of the invention is to provide an improved through checking system for use with memory systems, that can be constructed from inexpensive reliable components.

Another object of the invention is to provide an improved memory system for use in the data processing system wherein data word and error correction code signals associated with the data word are stored in conjunction with a parity bit for each combination of data word and its associated error correction code signal for providing through checking of the function of the error correction control circuitry.

Yet a further object of the invention is to provide an indication of a detected error in the operation of the error correction code circuitry in a memory system.

These and other more detailed and specific objectives will become apparent from a consideration of the drawings and the detailed description of the preferred embodiment.

SUMMARY OF THE INVENTION

The invention is an improved memory system for use in a data processing system, wherein the memory is arranged for storing data words and error correction code signals associated therewith at addressable location, and through checking circuitry for checking the operation of the error correction code circuitry. The invention includes a parity generating circuit for generating the parity of a data word together with circuitry for storing the parity bits so generated with the associated data word and its error correction code signals at the addressable location in the memory device. When a data word is accessed, circuitry is provided for generating new error correction code signals and comparing the newly generated signals with the error correction code signals read from the memory device. The comparison circuitry includes error correction circuitry that functions to correct a predetermined number of detected errors within the data read from the memory device. Parity generating circuitry for generating a parity signal for the data word read out, and after correction if correction is indicated, is provided with the capability of comparing the parity generated at readout with the parity stored with the accessed data word for determining whether a data bit has benn erroneously corrected due to malfunction of the error correction code circuitry. The comparison circuitry provides an error indicating signal when the parity calculated at read out has a predetermined relationship to the parity signal stored with the accessed word.

BRIEF DESCRIPTION OF THE DRAWINGS

FIG. 2 is an illustrative Input Data Word format.

FIG. 7 is a logic block diagram illustrating a Parity Checking circuit.

FIG. 8 is a logic block diagram of a Word Parity Generator.

FIG. 11 is a logic block diagram of an Error Correction Code Decoder and Correction Generator.

DESCRIPTION OF THE PREFERRED EMBODIMENT

Figure 1:
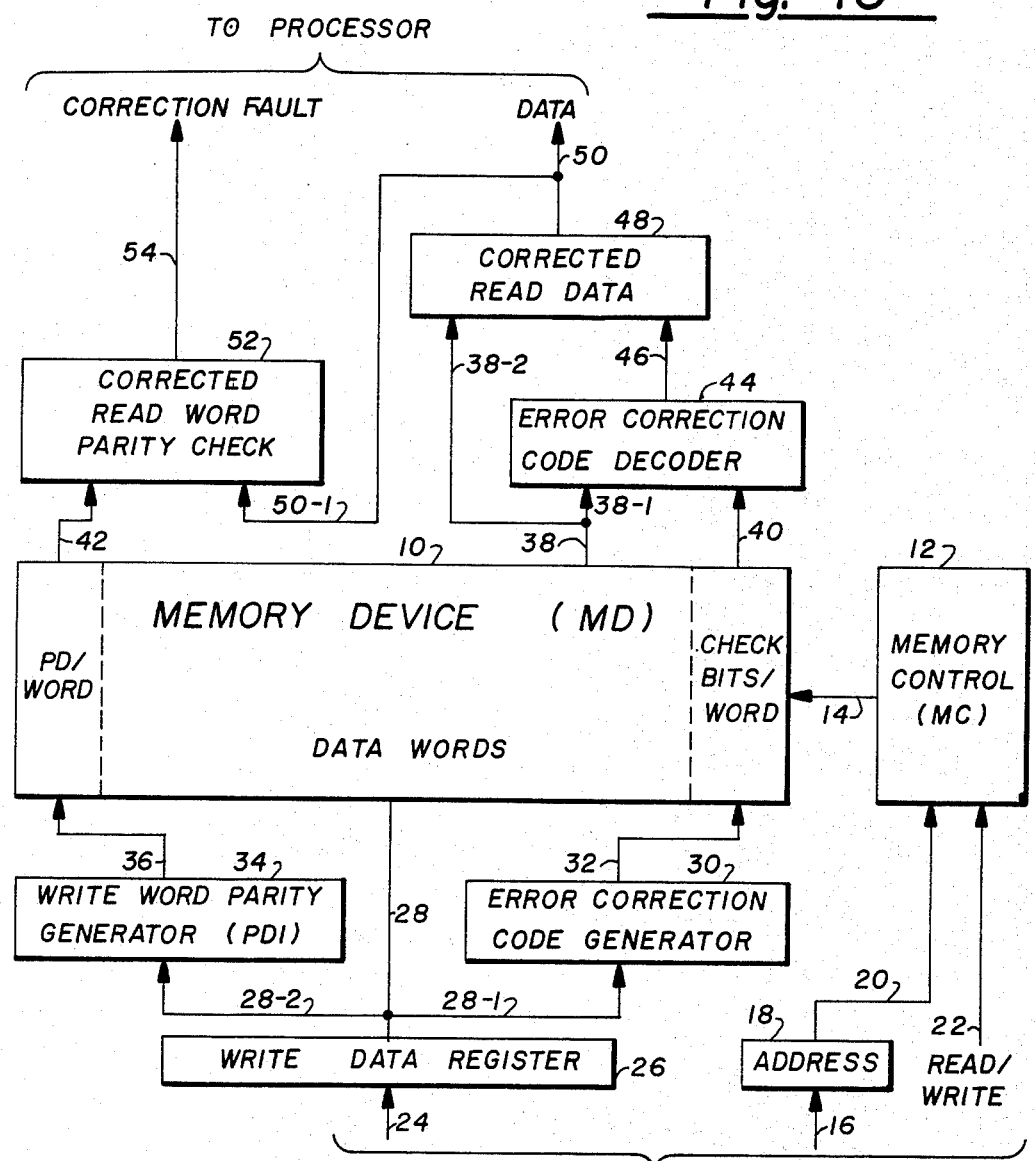
FIG. 1 is a simplified block diagram illustrating the use of a Word Parity bit to check the accuracy of the operation of Error Correction Code (ECC) Circuitry.

FIG. 1 is a simplified block diagram illustrating the use of a Word Parity bit to check the accuracy of the operation of Error Correction Code (ECC) circuitry. The subject invention is intended to operate in a digital data processing system having a data processing unit (not shown) for performing program manipulation of data words. The data processing system requires a facility for storing data words and instruction words, and accessing words thus stored. A Memory Device (MD) 10 is utilized for storing bit groupings called data words at addressable locations. The MD 10 is of a type commonly referred to as random access memory indicating that access is to addressable locations (not random) that are arbitrarily selectable. These types of memories are well known and are distinguished from serial memories such as magnetic tape and the like. The specifics of MD 10 need not be considered in detail, it being understood that the invention is operative to through check error correction circuitry used in conjunction therewith. The invention will work advantageously with any addressable MD 10, including magnetic disks, magnetic drums, core memories, integrated circuit memories, and any other type of memory element capable of addressable storing of binary information. Further, it can include systems that are classified as permanent storage as well as those systems classified as volatile storage systems. The detail operation of the MD 10 need not be considered for an understanding of the present invention. Detailed timing will not be described, since timing will depend upon selection of the individual MD 10 and its associated control circuitry as well as the individual circuit types utilized ancillary thereto. Further, detail control signals will not be described other than as to functional characteristics, since the control in conjunction with the timing will depend upon the particular circuit implementation, and will be apparent to those skilled in the art.

A Memory Control(MC) 12 provides control signals via path 14 to MD 10, for causing addressable accessing of MD 10. An Address is received on line 16 by an Address Register 18, which in turn provides it on line 20 to MC 12. The Address specifies the location in MD 10 at which writing will take place, or from which reading will be accomplished. A Read/Write Request is received on line 22 in conjunction with the Address specified on line 16, from the processor (not shown). The Read/Write selection signals advise MC 12 whether reading or writing is to be accomplished for the Address specified.

The Input Data is received on line 24 from the processor, (not shown) and is temporarily held in a Write Data Register 26. The format of the data as it comes in may not be in word format for recording, but once assembled in the Write Data Register 26 is available in the format for recording in MD 10 over line 28.

Prior to recording of the Input Data, the data bits are provided on line 28-1 to the Error Correction Code Generator 30. The Error Correction Code (ECC) system utilized generated signals referred to as Check Bits. These Check Bits are provided in accordance with a predetermined format of development on line 32 for recording along with the data words in memory cells that are accessed by the Address received on line 16. The use of the Check Bits will be described in further detail below.

The Input Data Word is also applied on line 28-2 to Write Word Parity Generator 34, for purposes of calculating a Parity bit (PDI) for the Write Data Word, which Parity bit is applied on line 36 for recording in MD 10 in memory cells specified by the Address. At this point, it should be noted that the parity for the Write Data is newly generated and there is not reliance on any parity bit or bits that might be transmitted across the interface from the processor. When Check Bits and PDI are generated, they are recorded with the Input Data bits as a total Write Word.

For a read function, the Address specified on line 16 results in MC 12 accessing the memory cells specified by the Address, and providing the Read Data on line 38, the associated Read Check Bits on line 40, and the associated data Parity signal PDO on line 42. The Read Data signals are applied on line 38-1 to the Error Correction Code Decoder 44 along with the associated Read Check Bits. The functioning of the error correction decoding will be described in more detail below, it being understood that in general it functions to provide signals in line 46 to the Corrected Read Data circuitry 48 for correcting a bit or bits in the Read Data applied on line 38-2. The resultant corrected Read Data applied on line 60 is an output to the processor, and is available on line 50-1 as a set of input signals to the Corrected Read Word Parity Check circuitry 52, which circuitry calculates a new Parity signal (PCRD) for the Corrected Read Data and compares it to the Parity signal PD stored with the accessed data word, and read therewith as PDO. If these two Parity signals compare, it indicates that the Error Correction Code Decoder 44 functioned properly, and the Corrected Read Data is properly available for use. However, if PCDR for the Corrected Read Data does not compare to PDO it indicates that a fault has occurred, and a Correction Fault signal is issued on line 54 indicating that malfunction.

It can be seen, that by the addition of the parity signal PD for each recorded Data Word there is the capability of checking the Error Correction Code Decoder 44, and the circuitry for providing the Corrected Read Data 48. It is recognized that additional through checking circuitry could itself inject error through malfunction of the Write Word Parity Generator 34, or the Corrected Read Word Parity Check circuitry 52. It is more important, however, to detect the errors in operation of the ECC circuitry that would otherwise go undetected, and to deal with potential error in the through checking circuitry, rather than not checking the integrity of the available corrected read data.

FIG. 2 is an illustrative Input Data Word format. The illustrative Input Data Word is a 36-bit word arranged in Bytes designated Byte 0, Byte 1, Byte 2, and Byte 3, each of the Bytes comprising a 9-bit grouping of data bits within the Data Word. Four Parity Bits P0, P1, P2, and P3 are utilized, each of these Parity Bits being associated with a like-numbered one of the Bytes. Parity Bits P0–P3 are used for checking accuracy of transmission of the Bytes across an interface between the processor and the memory system, and are not stored with the associated Data Word in the memory system.

Figures 3, 5:
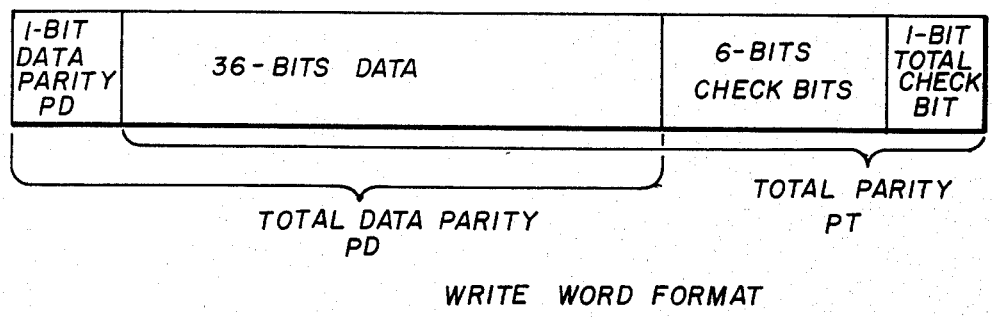
FIG. 3 is an illustrative Write Word format.
FIG. 5 is an Error Table illustrating Read Data bit error identification from Syndrome Bits determined from evaluation of Read Data bits in conjunction with recorded check bits.

FIG. 3 is an illustrative Write Word format. Each Write Word is comprised of the Data Word, which for this embodiment is a 36-bit field; the Check Bits utilized in the error detection/correction circuitry; which for this embodiment is a 6-bit field; a Check Bit Total, which for this embodiment is a 1-bit field; and a total Data Parity PD signal, which for this embodiment is a 1-bit field. As will be described in more detail below, the storage of the Data Bits and the Check Bits is similar to that in memory systems in the prior art. The addition of the Data Parity PD in conjunction with the circuitry utilized to evaluate such PD signals for through checking the ECC system, being the basis of the invention and previously unrecognized. Utilization and interrelation of these fields, together with the associated circuitry will be described below.

Figures 4, 9:
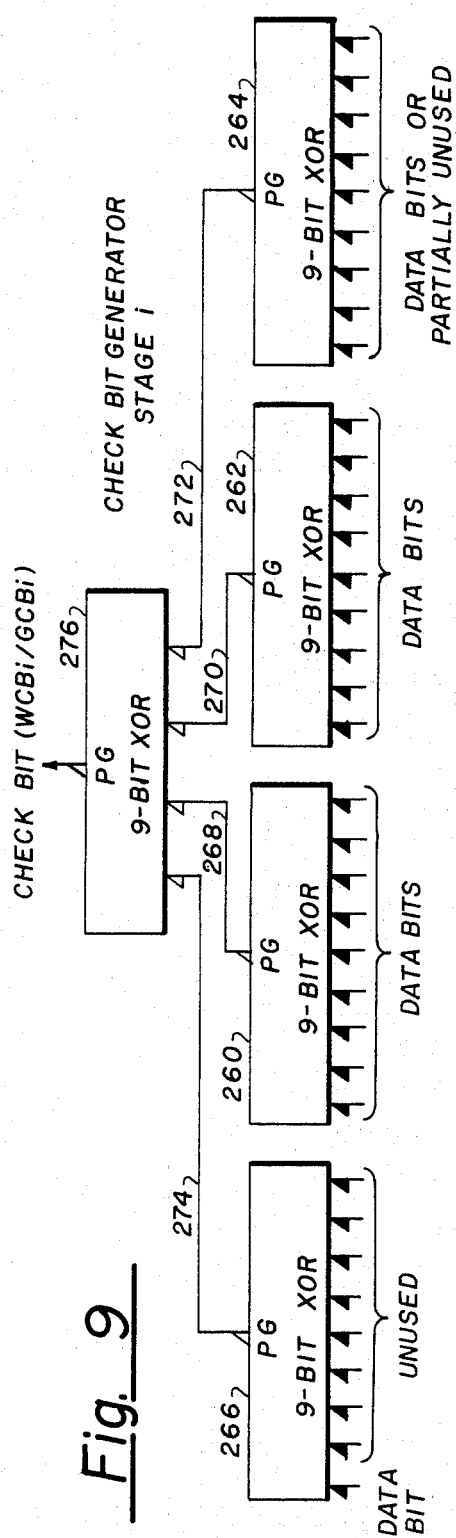
FIG. 4 is a Table illustrating the generation of Check Bits for use in an Error Correction Code system together with a total Data Parity bit.
FIG. 9 is a logic block diagram of one stage of a Check Bit Generator.

FIG. 4 is a Table illustrating the generation of Check Bits for use in an Error Correction Code system together with a total Data Parity bit. The use of error correction codes including the use of Check Bits is known. For the embodiment illustrated, the Check Bit encoding comprises a system for use with a 36-bit Data Word and provides capability of correcting a single detected error, and detecting multiple bits error. The Check Bits C0 through CT are each parity bits associated with predetermined bit groupings within the Data Word. The number of Check Bits generated and recorded will determine the power of the system to detect and correct multiple error conditions. The trade off for the enhanced reliability of data when read out is the additional overhead of system expense relating to the necessity for storing the Check Bits for each grouping, and the time necessary for each read out to translate the Check Bits, generate the Syndrome Bits, as will be described in more detail below, and to make the error correction. The generation of Check Bits is accomplished in the same manner as parity bits are generated, it being understood that each Check Bit is generated from a different unique combination of data bits. The generation of Check Bit C0 is accomplished by the formation of the sum of all odd numbered bit positions in the Data Word, where the summation is formed without carry. If this count indicates an odd result, that is a 1, Check Bit C0 will be set to a 1 condition, thereby establishing an even Check Bit parity for the configuration of data bits. In a similar manner, Check Bit C1 will be set provided the associated bit grouping yields an odd count. In a similar manner Check Bits C2, C3, C4, and C5 are formed by establishing the sum without carry for the bit positions indicated in the table. Check Bit CT is formed in a similar manner, and comprises a total parity due to the location of the selection of the associated data bits. The particular system for formation of Check Bits is illustrative only, it being understood that various other system for formation thereof are available.

The Total Parity PD for the data word is the parity for all bits in the Data Word.

FIG. 5 is an Error Table illustrating Read Data bit error idenification from Syndrome Bits determined from evaluation of Read Data bits in conjunction with recorded check bits. When a Data Word is read out from the memory system, the Read Data bits are subjected to evaluation for accuracy. This evaluation is accomplished by generating a new set of Check Bits from the Read Data bits as read, utilizing the identical fomulation system as that illustrated and described with regard to FIG. 4. The Check Bits thus generated are compared to the Check Bits recorded with the data word and read out with the Read Data for purposes of generating Syndrome Bits S0, S1, S2, S3, S4, S4, and ST. The generation of Syndrome Bits is accomplished by a bit-by-bit comparison of the two sets of Check Bits, with a Syndrome Bit being generated active for each of the Check Bits that do not compare. The combination of Syndrome Bits identifies which of the data bits or which of the Check Bits is in error, and provides means for correcting the single-bit errors. The positions in the Table indicated by the designation(.) indicates multiple error which can not be corrected. The situation when all Syndrome Bits are of a like predetermined state, for example 0, indicates that there is No Error (NE), and that the Read Data is correct without alteration. By way of example, if Syndrome Bits S0, S1, S2, and S4 are 0, and Syndrome Bits S3, S5, and ST are 1, the Table indicates that Read Data Bit 12 is in error and should be corrected. The generation of Check Bits, the generation of Syndrome Bits, and the decoding for error correction will be described in more detail below.

Figure 6:
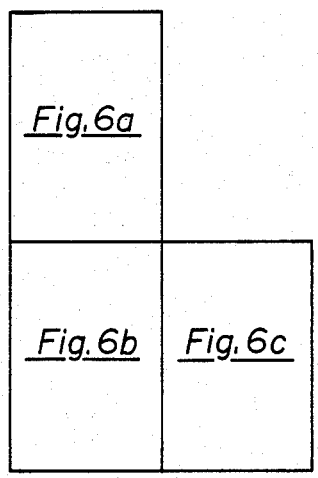
FIGS. 6a through 6c, when arranged as shown in FIG. 6, is a block diagram of a memory system incorporating the parity bit evaluation of the subject invention.
Figure 6C:
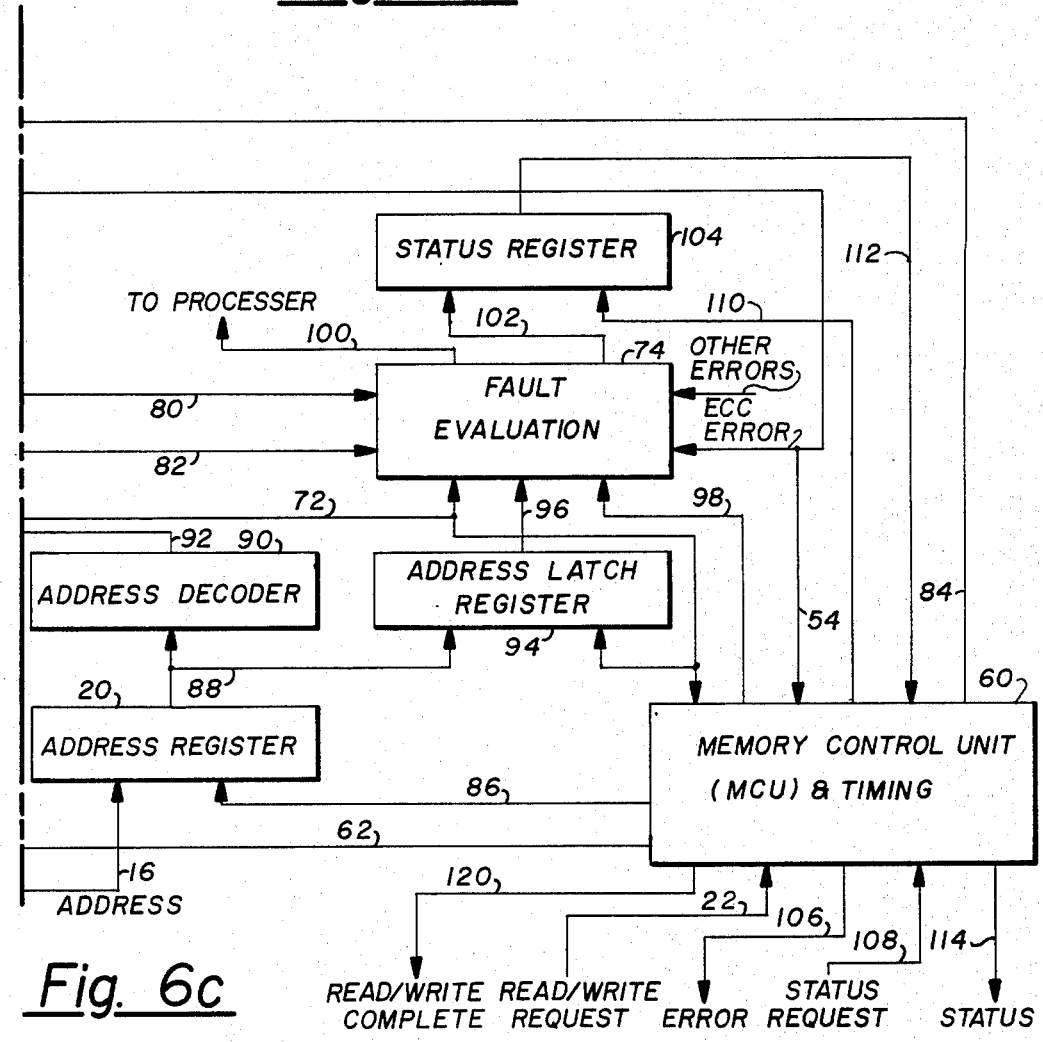
Figure 6A:
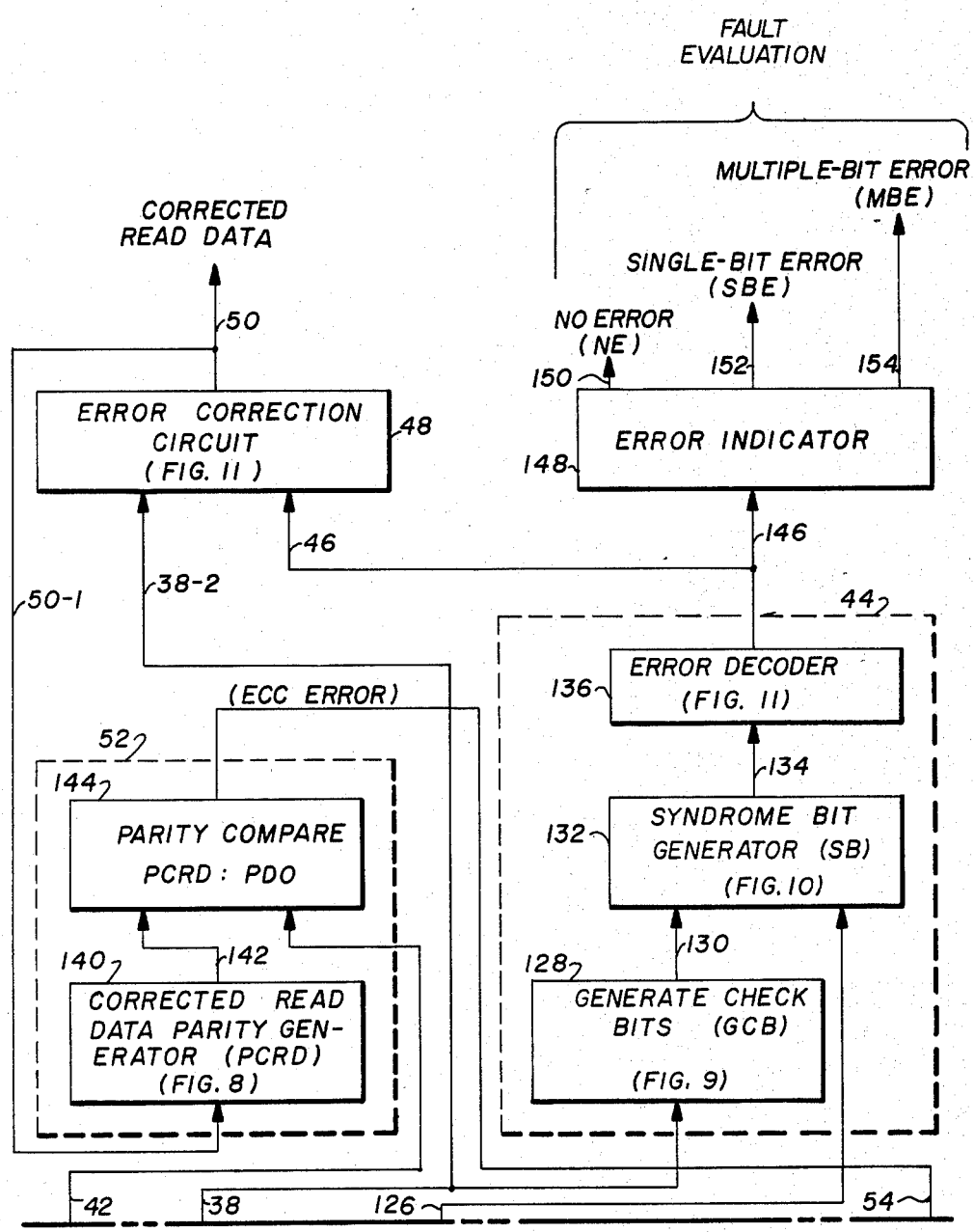
Figure 6B:
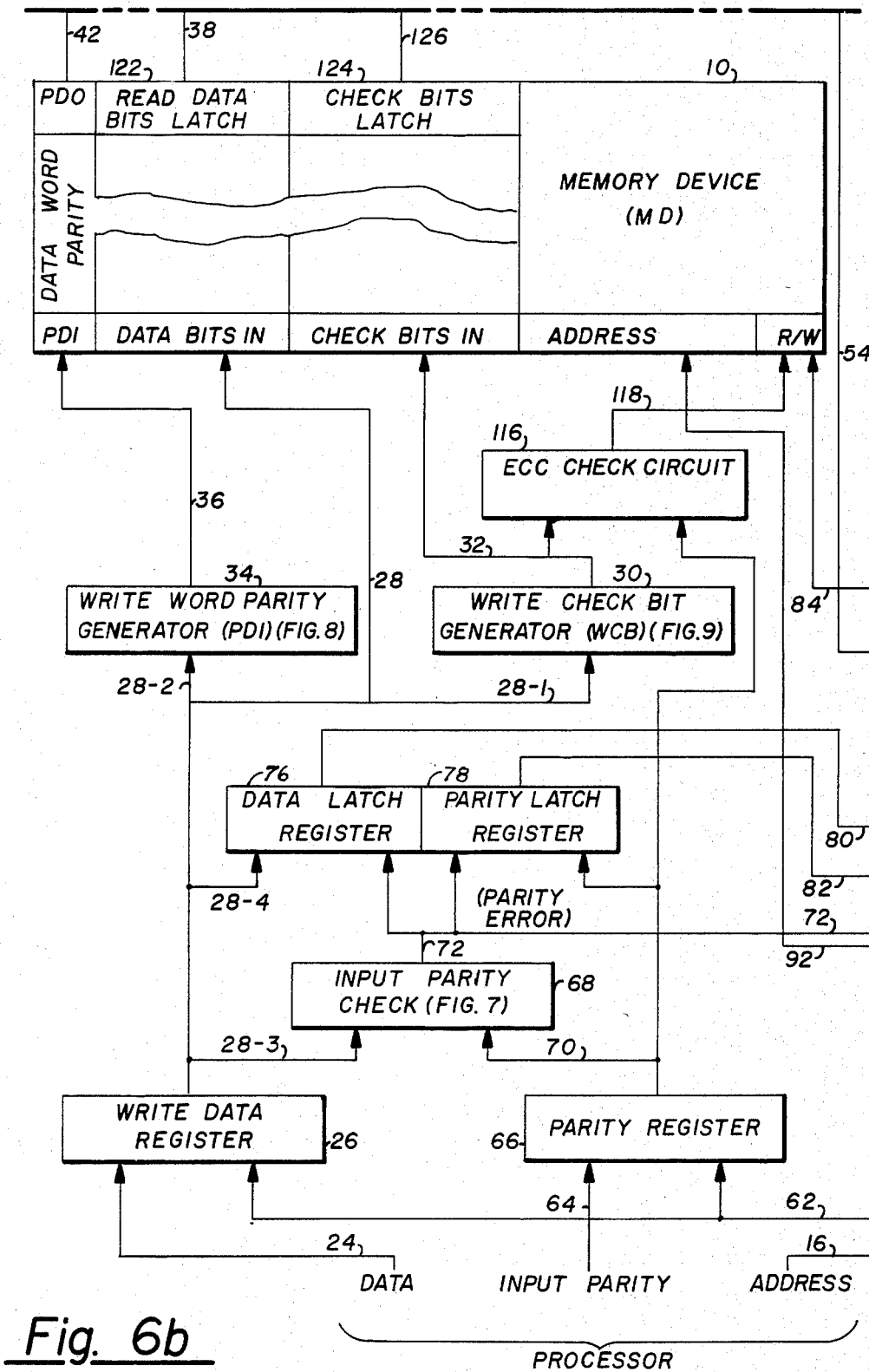

FIG. 6a through FIG. 6c, when arranged as shown in FIG. 6 is a block diagram of a memory system incorporating the parity bit evaluation of the subject invention. Elements and lines that have been previously described will bear reference numerals previously identified to the extent possible.

The Memory Control Unit (MCU) 60 receives the Read/Write Request signals on line 22, and functions to provide control signals and timing for the reading and writing operations in MD 10. The Input Data, also referred to as Write Data, is received on line 24 by the Write Data Register 26. When a Write function is requested, a signal is issued on line 62 for enabling loading of the Write Data in Register 26 together with the associated Input Parity from line 64 into Parity Register 66. In order to assure accuracy of transmission across the interface from the processor, the Write Data is provided on line 28-3 to the Input Parity Check circuitry 68. The Input Parity is provided on line 70. The Input Parity Check circuitry 68 checks the Write Data as received by recalculating the parity and comparing it to the Input Parity received on line 64. If the Input Data is found to be in error, a Parity Error signal is issued on line 72 which functions to advise MCU 60 of the fault, identify the fault condition in the Fault Evaluation circuitry 74, enable the Data Latch Register 76 for capturing the Write Data applied on line 28-4 and enable the Parity Latch Register 78 for capturing the Input Parity. The output from Data Latch Register 76 is provided on line 80, and the captured Input Parity is provided on line 82 as fault input signals to the Fault Evaluation circuitry 74. If no Parity Error is detected, the signal on line 72 will result in MCU 60 issuing an enable signal on line 84 for enabling the Write function to proceed.

MCU 60 issues a signal on line 86 to the Address Register 20 allowing the Address received on line 16 to be set therein. The Address is available on line 88 to the Address Decoder 90 which functions to translate the Address and issue appropriate control signals on line 92 for defining the Address in MD 10 at which Reading or Writing will take place. If Parity Error is detected, as indicated by the signal on line 72, the Address Latch register 94 will be enabled and the Address will be latched therein and made available in line 96 to the Fault Evaluation circuitry 74.

When faults are detected, an enable signal is provided on line 98 from MCU 60 which functions to enable the Fault Evaluation circuitry 74, which makes error data available on line 100 to the processor, and operates to provide signals on line 102 for setting appropriate identifying code signals in Status Register 104 for indicating the nature of the fault detected.

When an error, or fault condition, is detected, MCU 60 issues a signal on line 106 to the processor advising it of the existence of a fault. If the processor wishes to evaluate the fault, it provides a signal on line 108 to MCU 60 identifying a Status Request. In response thereto, MCU 60 issues a signal on line 110 to the Status Register 104, thereby enabling the transmission of its contents on line 112 through MCU 60 to the processor on lin 114. The processor than can evaluate the signal configuration received and identify the nature of the fault for purposes of determining whether integrity of the data has been inpaired or is otherwise useful.

If no Parity Error is detected by the Input Parity Check circuitry 68, the Write Data is made available to the MD 10 on line 28 for writing. Simultaneously, the Write Data is applied on line 28-2 to the Write Word Pairty Generator 34 for calculating the Total Data Word Parity PDI, which is made available on line 36 to MD 10 for writing. Further, the write Data is applied on line 28-1 to the Write Check Bit Generator 30 for calculating the Check Bits for the bit configuration of the Write Data word. The Check Bits are applied on line 32 for writing in MD 10. The generation of Check Bits can be checked by ECC Check Circuit 116. Circuit 116 can be of a type of circuit described in the above identified patent application Ser. No. 354,328 of John Reed Trost, or can be a parallel generation of Check Bits together with a comparison for determining accuracy of generation of the Check Bits. If the Check Circuit 116 is utilized, and it is found that the Check Bits are accurately generated, a signal is provided on line 18 which completes the enablement of the R/W selection and allows the entire Write operation to proceed. If the ECC Check Circuit is not utilized, Writing occurs automatically at the Address specified. MCU 60 is in control of the timing, and upon completion of the Write function, issues a signal on line 120 indicating completion of the requested operation.

Circuits identified as registers will not be described in detail, it being understood that they can be selected from types available commercially, there function being well known. Further, the Address Decoder 90 will not be described in detail, since the decoding will depend upon the nature of MD 10, and the configuration of the Address. Such Address Decoders are known in the art. The precise Fault Evaluation circuitry 74 will not be described in detail, it being understood only that fault evaluation is available, such circuits having been described in the prior art. Block elements including a figure number will be described in more detail with regard to the referenced figure number.

When a Read is requested by a signal on line 22, MCU 60 will issue a signal on line 86 for purposes of loading the Address in the Address Register 20. The Address is decoded by the Address Decoder 90 and applied on line 92 to MD 10. At the same time, MCU 60 issues a Read enable signal on line 84. The contents of the specified Address are read out such that the Read Data Bits are held in Read Data Bits Latch 122, and are made available on line 38. The Check Bits are read from MD 10, are held in Check Bits Latch 124, and are made available on line 126. The Data Word Parity PDO is made available on line 42. The Error Correction Code Decoder is shown enclosed in dashed block 44, and includes a Generate Check Bit circuit 128, which functions to generate Check Bits in the same format as utilized during writing utilizing the Read Data Bits received from line 38. These generated Read Check Bits are applied on line 130 to the Syndrome Bit Generator circuitry 132 where they are compared to the Check Bits read from the memory and received on line 126. The Syndrome Bits are utilized to identify the existence of errors, as well as identifying the error within the capability of the ECC system, and are provided on line 134 to the Error Decoder circuitry 136. The Error Decoder 136 issues control signals on line 46 to the Error Correction Circuit 48 for correcting the particular detected errors in the Read Data received on line 38-2. The Corrected Read Data is available on line 50 for transmission to the processor, and is also available on line 50-1 where it is applied to the Corrected Read Word Parity Check circuitry shown enclosed in dashed block 52. This checking circuitry involves calculation of the Corrected Read Data Parity from the Corrected Read Data in the Corrected Read Data Parity Generator circuit 140. This Corrected Read Data Parity (PCRD) is applied on line 142 to the Parity Compare circuitry 144, where the newly calculated Parity PCRD is compared to the Data Parity PDO applied on line 42. If these two Parity signals compare, it indicates that the ECC circuitry operated properly and the Corrected Read Data applied on line 50 is accurate. If these Parity signals do not compare, and ECC Error signal is provided on line 54 indicating a Correction Fault and is applied to MCU 60 and the Fault Evaluation circuitry 74. The MCU 60 would issue an Error signal on line 106 indicating that the data coming across the interface is incorrect and that appropriate action should be taken to further evaluate the data or to reject it from further use.

In addition to correcting the Read Data when errors are detected, the signals from the Error Decoder 136 are applied on line 146 to the Error Indicator 148. This circuitry evaluates the nature of the decode signals and for this embodiment can provide a No Error signal on line 150, or a Single Bit Error (SBE) signal on line 152, or a Mutliple Bit Error (MBE) signal on line 154. These signals are utilized in the Fault Evaluation circuitry for appropriate control of the Status Register 104. An Error Indicator of this type can be found described in detail in the above indentified U.S. patent application, Ser. No. 324,290, of Burns et al., now abandoned.

FIG. 7 is a logic block illustrating a Parity Checking circuit. For purposes of the description, the closed arrow head will be considered a binary one, and open arrow head will be considered a binary zero. The description will be provided for odd parity, it being understood that it would be clear to one skilled in the art to adjust the circuit and the signals for even parity. With reference to FIG. 2, it will be recalled that the Input Data Work Format includes four Bytes, each comprising a 9-bit segment of the Input Data, and each of the Bytes having a Parity bit associated therewith. In order to check the parity, each of the Bytes is evaluated to determine that it has been correctly transmitted. Byte 0 is provided on line 28-3/0 to Parity Generator (PG0) 200, which functions to calculate the parity for Byte 0 as received. It performs a summation without carry of the input signals and provides an output signal on line 202 that will be 1 or 0 depending upon whether the count is even or odd, respectively, thereby establishing the odd parity. This signal is applied to exclusive-or (XOR) 204, which is also adapted to receive Parity P0 on line 70-0. XOR 204 provides a 0 output signal on line 206 when both input signals are 0 or when both input signals are 1, thereby indicating comparison of the parity generated after transmission is the same as the transmitted Parity P0, or provides a 1 output if the parity generated does not compare to the parity received. This output signal is applied to OR circuit 208, which functions to provide a 0 output signal on line 72 so long as none of the input signals is one. Alternatively stated, if any input signal to OR 208 is a 1 indicating noncomparison, OR 208 issues a 1 signal on line 72 indicative that a Parity Error exists. In a manner similar to that just described, Byte 1 is supplied on line 28-3/1 to Parity Generator (PG1) 210 which provides the calculated parity on line 212 to XOR 214 for comparison with Parity P1 received on line 70-1. The output of the comparison is provided on line 216 to OR 208. Byte 2 is provided on line 28-3/2 to Parity Generator (PG2) 218 with the calculated parity signal provided on line 220 to XOR 222. Comparison with the Parity P2 received on line 70-2 results in the output on line 224 being applied to OR 208. Finally, Byte 3 is applied on line 28-3/3 to Parity Generator (PG3) 226 which provides the calculated parity on line 228 to XOR 230. It forms the comparison with the received Parity P3 on line 70-3 and provides the comparison signal on line 232 to OR 208.

FIG. 8 is a logic block diagram of a Word Parity Generator. For a 36-bit Input Data Word, or a 36-bit Corrected Read Data Word, the same logical configuration can be utilized for determining an overall word parity. Again, assuming odd parity, the circuit must function to provide the sum without carry of the data bits and issue a parity output signal of 1 if the count is odd, or 0 if the count is even. The Parity Generator includes four 9-bit Parity Generator (PG) circuits 240, 242, 244, and 246 each arranged for receiving 9-bits of of the data word, whether it be the Input Data Word or the Corrected Read Data Word. Each of these PG circuits 240, 242, 244, and 246 calculate the parity of the 9-bit segment applied thereto, and provides signals on line 248, 250, 252, and 254, respectively to PG circuit 256 which generates the total Word Parity. For the parity calculation of the Input Data word, the output Parity PDI, is available for recording in MD 10. For the circuit arrangement that is calculating the Parity PCDR of the Corrected Read Data Word, the output signal is available for the parity comparison. The description of the Word Parity Generator for the Input Data Word has been made as though it is totally separate from the Parity Check described in FIG. 7. The circuit can be separately arranged as shown, or can be combined such that Parity Generator circuits 200, 210, 218, and 226 are utilized to drive PG circuit 256. The Word Parity Generated for the Corrected Read Data Word would be a totally separate circuit configuration of the type illustrated in FIG. 8.

FIG. 9 is a logic block diagram of one stage of a Check Bit Generator. In the calculation of the Check Bits, the generation of Check Bit C4 involves the largest number of data bits. In the configuration shown, a 28-bit segment of the Data Word must be summed without carry to form the Check Bit. If the sum without carry results in an odd count, the associated Check Bit will be 0, and if the sum without carry results in an even count, the associated Check Bit will be 1. To calculate C4 9-bit Parity Generator Circuit PG 260 for handling a 9-bit segment and 266 for handling a single bit, are used. These circuits provide output signals on lines 268, 270, 272, and 275, respectively, to PG 276 which forms the final combination of signals to provide the Check Bit C4. A similar circuit arrangement will be utilized for the Write Check Bit$_i$ (WCB$_i$) or the Generator Check Bit$_i$ (GCB$_i$).

For the generation of C0, which involves only an 18-bit segment, only PG 260 and PG 262 would be required in conjunction with PG 276. The same would be true for Check Bit C1. Check Bit C2 involves a 20-bit segment of the Data Word and would require PG 260, PG 262, and two active inputs to PG 264 in conjunction with PG 276. Check Bit C5 involves a 24-bit segment of the Data Word and for that stage of the Check Bit Generation would require BG 260, BG 262, and six active input lines for PG 264 in conjunction with PG 276. It can be seen, then, that the logic arrangement shown for Stage i of the Check Bit Generator readily defines all of the circuit arrangements for Check Bit generation.

Figure 10:
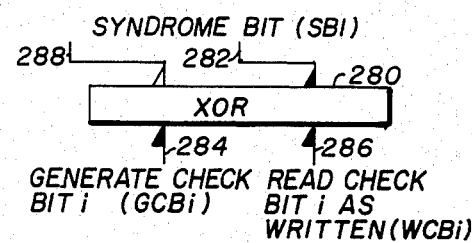
FIG. 10 is a logic block diagram of one stage of a Syndrome Bit Generator.

FIG. 10 is a logic block diagram of one stage of a Syndrome Bit Generator. Syndrome Bit generation is accomplished by comparing each of the Read Check Bits as written (WCB$_i$), to the associated Generated Check Bits (GCB$_i$). For the i stage, XOR 280 provides the comparison and provides the output Syndrome Bit SB$_i$ on line 282 of 1, when the GCB$_i$ received on line 284 is different from the WCB$_i$ received on line 286. Conversely, when input signals on line 284 and 286 are the same, a 0 output signal is provided on line 282. The output signal on line 288 will be the inverse or complement of the signal provided on line 282.

FIG. 11 is a logic block diagram of an Error Correction Code Decoder and Correction Generator. The Error Decoder is shown enclosed within dashed block 136, and comprises a plurality of AND circuits for decoding the Syndrome Bits. There is an AND circuit for each bit position of the Read Data, and each such AND circuits functions to determine whether or not its associated bit position of the Read Data should be complemented because found to be in error. Each of the AND circuits function to provide an active output signal, for this embodiment a 1, when all of its input signals are 0. Both the true and complement values of the Syndrome Bits are received on lines collectively referred to by reference numeral 134. The open arrow head input lines indicate connections to the true output for the associated Syndrome Bit and the closed arrow head indicates connection to the complement output for the associated Syndrome Bit. Attention is referenced to FIG. 5 which describes the combination of Syndrome Bits for identification of a bit position in error in Read Data. When all Syndrome Bits are 0, it indicates that there is No Error and the Read Data Word pases through unaltered. When all Syndrome Bits are 1, it indicates that the bit position 35 is in error. Referring back to FIG. 11, it can be seen that AND-35 300 has all closed arrow heads at the input, thereby indicating that when all syndrome Bits are 1, the complement input combination will be all 0's. This will result in a 1 output signal on line 46-35 indicating that bit 35 should be complemented. For bit position 34, AND-34, labeled 302 has Syndrome Bit S0 in the 0 state and all other Syndrome Bits being 1 (see FIG. 5). Then these input conditions are satisfied, a 1 signal will be provided on line 46-34. In a similar manner AND-17, labeled 304, decodes correction of bit-17; AND-1, labeled 306, decodes correction for the bit position 1; and AND-0, labeled 308, decodes correction of the 0 of bit position. Not all of the bit position decoding is illustrated, since it is readily apparent how interconnection would be made from description of the circuits illustrated in conjunction with combinations specified in FIG. 5. It should be understood that for the number of circuits driven, additional intermediate driver circuits (not shown) may well be required to provide sufficient drive from the Syndrome Bit Generator 132. It should be understood that the AND circuits are of the type well known and available commercially. It is also recognized that the Error Decoder 136 could be accomplished with a decoder tree utilizing cascaded 2-to-4 decode circuits of a type expanded from that shown in the co-pending U.S. patent application Ser. No. 324,290, now abandoned, of Burns, et. al., previously identified.

When the Syndrome Bits have been decoded, the Read Data can be corrected. The Error Correction Circuit is shown enclosed within dashed block 48, and utilizes an XOR circuit for each bit position. Not all bit positions are illustrated, it being understood that those bit positions not illustrated would be arranged in the similar configurations. The Read Data Bits are received on line collectively referenced by reference 38-2. Each Read Data Bit is coupled to an associated XOR circuit. Read Data bit 0 (RD0) is coupled to XOR 310 which is also adapted to received the correction signal on line 46-0 as previously mentioned. The signals on the correction lines 46-0 through 46-35 control complementing of the associated Read Data Bit. Therefore, when a 1 signal is applied on line 46-0 to XOR 310, and RD0 is 1, the output signal on line 50-0 will be 0. Conversely, if the signal on line 46-0 indicates correction and RD0 is 0, the output signal on line 50-0 will be 1. In a similar manner XOR 312 corrects the output signal for the 1 bit position signal for the bit position 17 on line 50-17, XOR 316 provides the corrected output signal for bit position 34 on line 50-34, and XOR 318 provides the corrected output signal for bit position 55 on line 50-35.

Figure 12:
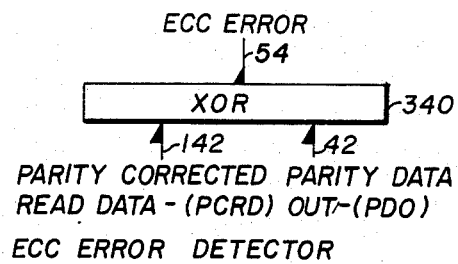
FIG. 12 is a logic block diagram of an Error Correction Code Error Detector.

FIG. 12 is a logic block diagram of an Error Correction Code Error Detector. The comparison is accomplished by XOR 340, which compares the state of the Parity PDO of the Write Data as Read from MD 10 on line 42 to the Parity PCRD of the Corrected Read Data received on line 142. If these two Parity signals are identical, no ECC Error signal sill be issued on line 54, since the Corrected Read Data has been determined to provide the same Parity as that originally written with the Write Data. In the event the two Parity signals PDO and PCRD are not the same, the ECC Error signal will issue on line 54, thereby indicating that an Error took place in the correction of the Read Data.

The logic circuits of the preferred embodiment include only circuits that are available commercially. The 9-bit Parity Generator circuits can be part No. 10170, available from commercial vendors.

It will be readily apparent to those skilled in the art how to modify the structures of the illustrated preferred embodiment to accommodate different ECC systems of encoding and decoding, and different word sizes.

In view of the foregoing description of the inventive concepts, consideration of the drawings and specific examples, it can be seen that the various stated purposes and objectives of the invention have been met. Without departing from the spirit and scope of the invention, what it intended to be protected by the Letters Patent is set forth in the appended claims.

What is claimed is:

1. For use in a digital data processing system having a memory system for addressably storing data words, each with associated check bits for use by error correction code circuitry, an error correction through check system comprising:

input means for receiving data words for recording at addressable storage locations in the memory system;

check bit generating means coupled to said data input means for generating check bit signals in a predetermined system in response to said data words, said check bit signals available for recording in the memory system along with associated ones of said data words, said check bit signals utilized for detecting and correcting errors in said data words when read out from the memory system;

data word parity generating means separate from said check bit generating means coupled to said data input means for generating a data word parity signal for each of said data words, where each of said data words is the same respectively as the associated one of said data words applied to said check bit generating means;

data word parity signal recording means coupled to said data word parity generating means for recording respective ones of said data word parity signals in the memory system together with associated ones of said data words and associated ones of said check bit signals, such that when a read data word and the associated ones of said check bit signals are read out of the memory system, the associated one of said data word parity signals will be read out therewith;

read out means for reading selected ones of said data words with associated ones of said check bit signals and the associated one of said data word parity signals from the memory system;

parity read out means for reading out said data word parity signals, each associated with respective ones of said selected ones of said read data words;

error detection and correction means coupled to said read out means and responsive to said read data words and associated one of said check bit signals for detecting errors in said read data words as read out and for correcting said errors that are correctable and for providing corrected read data words and for providing ones of said read data words that are correct at read out; and through checking means separate from said error detection and correction means and coupled to said parity read out means and said error detection and correction means and responsive to said read data words after correction when correction is required or said read data words that are correct as read out, for generating a total read data parity signal for each of said corrected read data words and for comparing each of said total read data parity signals to the associated one of said data word parity signals read from the memory system for detecting malfunctions in the through check system and for providing error indicating signals when said malfunctions are detected.

2. A through check system as in claim 1 wherein said through checking means includes:

exclusive-or circuit means for performing said comparing of each of said data word parity signals and to an associated one of said total read data parity signals for providing said error indicating signals indicating said malfunctions when a first comparison condition is found and for passing the associated one of said read data words or the associated one of said corrected read data words when a second comparison condition is found.

3. In a data processing system capable of providing memory addresses for reading and writing data words at addressable locations, and for providing write data words and receiving read data words, error correction code generating circuitry for generating error correction code check bit signals for data words to be written, an addressable memory system having a plurality of addressable locations, where each of said addressable locations is capable of storing a data word with error correction code check bit signals associated therewith and a total data word parity signal, and error detection and correction circuits for correcting data words read out when determined to be in error from evaluations of the associated check bit signals, and a through check system, the method of through checking and detecting malfunction comprising the steps of:

a. generating a total data word parity signal for each data word to be stored at an addressable location in the memory system;

b. recording the total word parity signals with associated ones of said data words;

c. separately generating error correction code check bit signals from associated ones of said data words;

d. recording said check bit signals with said data words;

e. reading out read data words and associated ones of said check bit signals and the total word parity signals respectively associated therewith;

f. checking the accuracy of each of said read data words utilizing the read out ones of said check bit signals and providing corrected read data words in response to recorded data words and associated ones of said check bit signals read from addressable locations in the memory system when a correctable error in said read data word is found, and providing said read data word when no correctable error is detected;

g. generating total read data parity signals in response to said corrected read data words when correctable errors are found or from said read data words when no errors are detected;

h. comparing each of the associated one of said total read data parity signals to each of the associated ones of the total data word parity signals read from the memory system; and i. providing a fault signal when one of said total data word parity signals and an associated one of said total read word parity signals do not compare, for providing an indication of malfunction.

4. In a data processing system capable of providing memory addresses for reading and writing data words at addressable locations, an addressable memory system having a plurality of addressable locations, where each of said addressable locations is capable of storing a data word and error correction code check bit signals associated therewith and a total data word parity signal associated therewith, an through check system comprising:

receiving means for receiving data words to be recorded at addressable locations in the memory system;

error correction code generating means coupled to said receiving means for generating error correction code signals for each of said data words and to be stored at the same addressable location;

data word parity generating means separate from said error correction code generating means, and coupled to said receiving means for generating a total data word parity signal for each of said data words to be stored with the associated one of said data words at the same addressable loctions, said data word parity generating means independently operable from said error correction code generating means;

recording means coupled to said receiving means, to said error correction code generating means, and to said data word parity generating means for recording the ones of said check bit signals and the one of said total data word parity signals associated with one of said data words at the same addressable location in the memory system;

reading means for accessing addressable locations in the memory system for reading out data words with the associated ones of said check bit signals and the associated ones of said total data word parity signals;

error detection and correction means coupled to said reading means and responsive to read data words and associated check bit signals read out for providing corrected read data words when correctable errors are determined to exist or for providing read data words when no errors are detected;

read word parity generating means coupled to said error detection and correction means for generating read data parity signals associated with said corrected read data words when a correctable error is found to exist or from said read data word when no errors are detected; and comparison means coupled to said reading means and to said read wrod parity generating means for comparing each of said total word parity signals read from the memory system to said read data parity signals, and for providing a first signal when a first comparison condition is found and for providing a second signal when a second comparison condition is found, said second signal indicative of malfunction of said through check system.

* * * * *

UNITED STATES PATENT AND TRADEMARK OFFICE
CERTIFICATE OF CORRECTION

PATENT NO. : 4,531,213

DATED : July 23, 1985

INVENTOR(S) : James H. Schueneman

It is certified that error appears in the above-identified patent and that said Letters Patent is hereby corrected as shown below:

In the Claims:

Column 14, Line 68, "an" should be -- a --.

Column 15, Line 13, "loctions," should be -- locations, --

Column 16, Line 17, "wrods" should be -- words --.

Signed and Sealed this

Nineteenth Day of November 1985

[SEAL]

Attest:

DONALD J. QUIGG

Attesting Officer

Commissioner of Patents and Trademarks